Jan. 31, 1933.                C. W. TODD                1,895,500
                              LOCOMOTIVE
                          Filed May 7, 1929        2 Sheets-Sheet 1
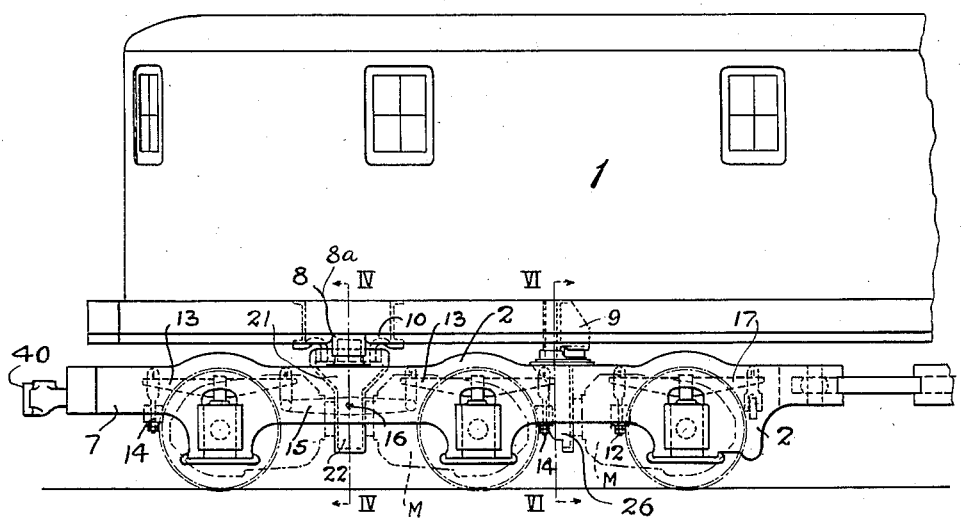
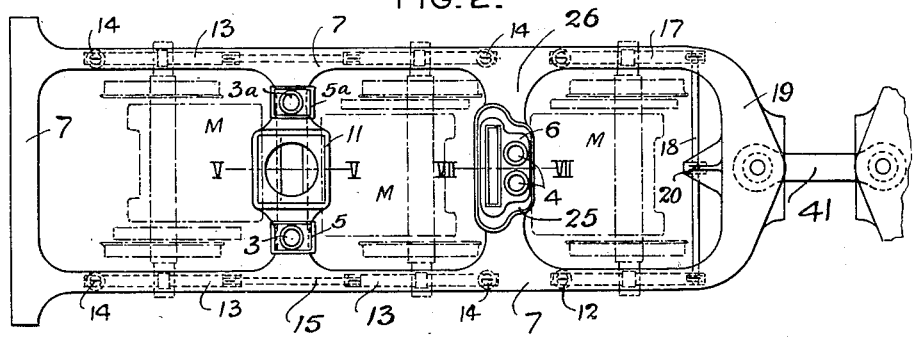
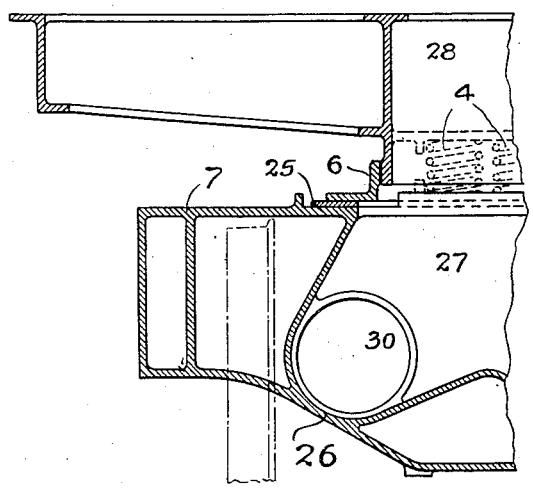
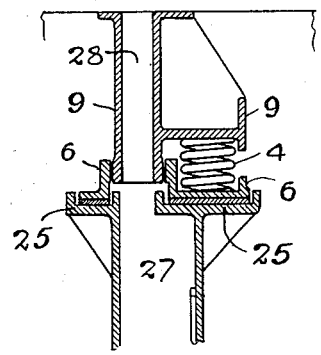
INVENTOR
Charles W. Todd
BY S. C. Yeaton
ATTORNEY Jan. 31, 1933.   C. W. TODD   1,895,500
LOCOMOTIVE
Filed May 7, 1929   2 Sheets-Sheet 2
– FIG. 3. –
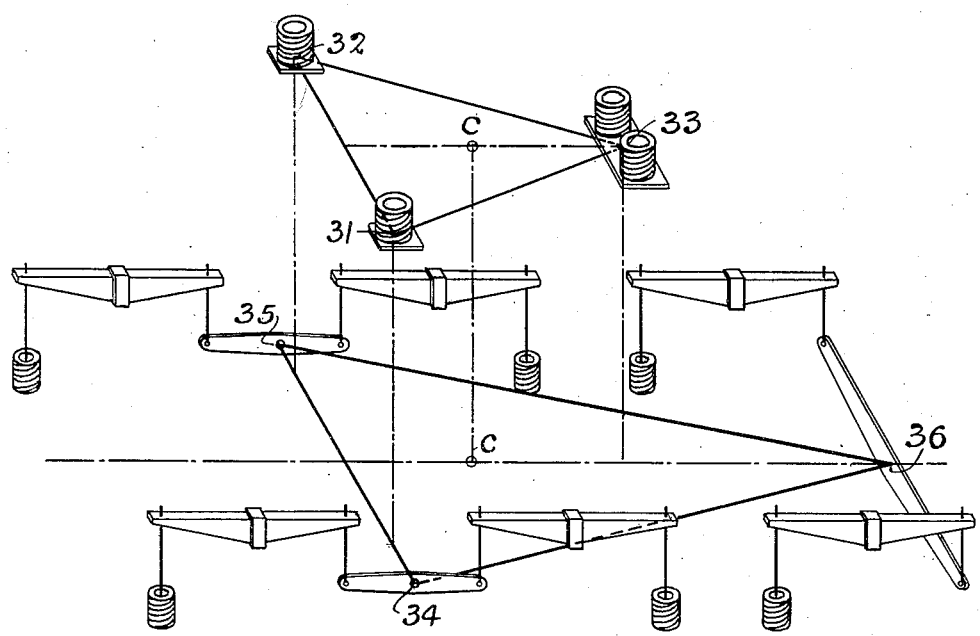
– FIG. 4. –
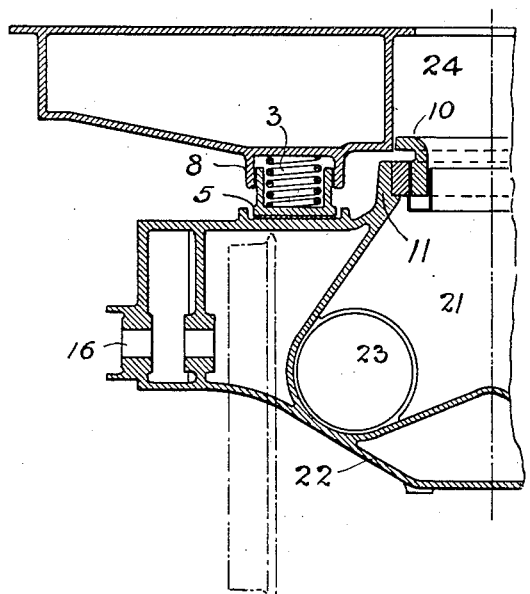
– FIG. 5. –
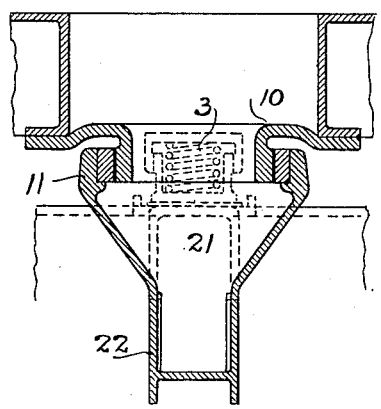
INVENTOR
Charles W. Todd
BY
S. C. Yeaton
ATTORNEY Patented Jan. 31, 1933

1,895,500

UNITED STATES PATENT OFFICE

CHARLES W. TODD, OF SCHENECTADY, NEW YORK

LOCOMOTIVE

Application filed May 7, 1929. Serial No. 361,088.

This invention relates to certain improvements in locomotives, particularly of the electric type, wherein two or more trucks support the cab or other superstructure extending over said trucks, and are pivotally connected therewith.

An object of the invention is to support the spring borne weight, or load, comprising the cab and associated parts, in such a manner that its virtual center of gravity, or load centroid, shall be symmetrically disposed with respect to the carrying wheels of the truck, irrespective of the pivotal point of connection between said cab and said truck. A further object of the invention is the augmenting of the resilient supporting means by the interposition of additional springs between the truck and the cab, whereby shocks to the cab and contents are dampened.

Heretofore it has been customary to support the cab of multi-truck locomotives by means of coacting center plates attached respectively to the truck frame and the cab, and vibrations due to inequalities of the track are thereby transmitted from the truck frame to the cab, dampened only by the resilient means interposed between said truck frame and the carrying wheels. This invention is directed toward providing additional resilient dampening means interposed between the truck frame and the superstructure, the center plates being in engagement horizontally but not vertically, thus preventing the transmission of vertical vibrations from the truck frame directly to the cab and contained parts.

The improvement claimed is hereinafter fully set forth.

In the accompanying drawings, Figure 1 is a side view in elevation of one end of an electric locomotive; Fig. 2 is a plan view of the truck shown in Fig. 1; Fig. 3 is a diagrammatic representation of the cab supporting means, and the cooperating spring equalization system of the truck; Fig. 4 is an enlarged fragmentary section on the line IV—IV of Fig. 1; Fig. 5 is an enlarged fragmentary section on the line V—V of Fig. 2; Fig. 6 is an enlarged fragmentary section on the line VI—VI of Fig. 1; and, Fig. 7 is an enlarged fragmentary section on the line VII—VII of Fig. 2.

In the practice of the invention, referring descriptively to the specific embodiment thereof as exemplified in Figs. 1 and 2, the cab or superstructure 1, is supported at either end by trucks 2, one of which is shown by means of springs 3, 3a and 4, mounted in shoes 5, 5a and 6, which bear at their lower extremities, on suitable seatings affixed to the truck frame 7, and are operably associated with the receptacles 8, 8a and 9, affixed to the cab 1.

The shoes 5, 5a, are movable on the seatings, longitudinally with respect to the frame 7, and radially with respect to the center plate 11 of the frame. The seating is of sufficient length, and the flanges on the same are spaced with sufficient clearance to allow this horizontal sliding of the shoes. The shoe 6, is movable on its seating, laterally with respect to the frame 7, and radially with respect to the center plate 11. Its seating is of sufficient width and the flanges on the same are spaced with sufficient clearance to allow its horizontal sliding movement. The center of gravity of the spring borne load carried by the wheels of the truck 2 is represented by a vertical line passing through the point C (Fig. 3), hereinafter called the load centroid, and the supporting springs 3, 3a and 4 are symmetrically disposed with respect thereto. It will also be noted that all of the springs 3, 3a, and 4, are fixed with relation to each other, that is to say, they are adapted to move in unison with the cab when the cab moves horizontally with relation to the trucks. The relative, triangular position of the springs, therefore, will remain the same at all times and the load centroid will be maintained through the center of the triangle so that a substantially equal proportion of the load will be carried by the respective springs at all times.

The hollow center plate 10, is affixed to the cab 1, in any desired location, cooperating with the truck center plate 11, affording pivotal connection between the cab 1, and the truck 2, in a manner to permit horizontal rotative action thereabout, but carrying no vertical load.

The primary suspension of the truck frame 7 of the truck 2, on the axles is accomplished by means of the springs 13, which rest on suitable journal boxes, and are secured by suitable means to the frame 7 at the points 14, and to the equalizers 15, which latter are pivotally attached to the frame 7 by the fulcrum pins 16, thus equalizing a pair of axles together on each side of the truck. The third axle carries the springs 17, the inner ends of which are attached to the truck frame at 12 by suitable means, but the outer ends of which are attached to a cross equalizer member 18, pivotally attached at 20 to a cross member 19 of the frame 7 midway of the sides.

The effect of the above described arrangement is diagrammatically illustrated in Fig. 3, wherein it is seen that the loading of the truck frame at the three points, 31, 32 and 33, symmetrically disposed with respect to the centroid C of the imposed load, insures an equable distribution of said load on said frame. Further, the arrangement of the equalizing system, whereby said system is pivotally attached to the truck frame 7 at three points, 34, 35 and 36 symmetrically disposed with respect to the carrying axles and the virtual center of gravity, or centroid of the spring borne load, ensures an equable distribution of said load among the carrying journals of said axles.

In locomotives of the class described, and to the improvement of which this invention is mainly directed, the driving power or tractive force may be applied through the agency of electric motors, shown in outline in Figs. 1 and 2, and denoted by the letter M, which are supported by the frame 7, and drive the carrying wheels by suitable means. In the continued operation of such motors, heat is developed which must be dissipated to avoid damage to said motors, and for this purpose a current of cooling air is commonly supplied by means of a fan and suitable ducts. This invention provides for greater latitude in the selection of suitable location of said ducts on the truck frame 7, than has heretofore been possible in the following manner:—

The cab body center plate 10 is formed hollow, and serves as a portion of an air duct for conveying air from the fan, and cooperates with a duct 21 formed in the transom 22 of the truck frame 7, of which the truck center plate 11 forms an integral part.

As shown in Fig. 4, cooling air supplied by a fan to the duct 24 flows through the hollow center plate 10 onto the hollow transom duct 21 and thence to the adjacent motors M through suitable connections 23, leading thereto.

For the cooling of the motor attached to the inner axle, the air from the cab 1, passes through a duct 28 of the hollow member 9, which is slidably encompassed by a flange formed on the shoe 6, which shoe is adapted to slide on a suitable seating 25 formed on the truck frame transom 26. Said shoe is provided with extending lateral flanges sufficiently wide to prevent the duct 27, hereinafter described, in the transom being uncovered to the atmosphere.

The transom 26 is shown in section in Figs. 6 and 7, and is formed hollow to comprise the duct 27 having its entrance through the seating 25, and said duct is adapted to receive air from the duct 28, in the extension 9, an airtight joint being ensured by the cooperant action of the flanged shoe 6, the extension 9, and the seating 25 on the transom. The air thus supplied to the hollow transom 26 is delivered to the adjacent motor M through suitable connections 30, leading thereto.

When a locomotive of the class described is in use, it may be coupled to the train which it is designed to draw by means of the draft gear or drawhead 40, attached to the truck frame 7. Other coupling means, as the drawbar 41 connects the first truck to the other truck or trucks of the locomotive, and transmits the tractive force developed by the motors of such other trucks to the pulling drawhead 40. In the above method of operation, it is obvious that no pulling stress is exerted on the frame of the cab, the function of the pivotal connections comprising the center plates being merely to maintain the cab and trucks in their predetermined relative positions, and no pulling stress is transmitted through said pivotal connection.

In certain cases, it may be desirable to attach the drawhead 40 to the cab 1, thus imposing a horizontal pulling stress on the pivotal connection 10, which in such event, may readily be formed with sufficient wearing surface to adequately transmit such stresses, and in no way departing from the spirit of the invention or imposing a vertical load on the pivotal connection.

It will be noted that the invention provides means for so locating the center plates of the cab and truck that they will not interfere with inspection of the motors, yet the same effect with respect to the equable loading of the axles is obtained as if said center plates were located in the central axis of gravity of the spring borne load, as has heretofore been requisite and customary.

Advantage is also taken of the reaction of the secondary supporting springs interposed between the truck and the cab, to hold the flanged shoe 6 firmly to the seating 25 and thus prevent the escape of air from the duct 27, 28. Said springs also tend to greatly diminish the shocks and vibration transmitted to the cab and the complicated apparatus usually contained therein, the elimination of all vertical loading from the center plates tending to produce the same result. It will be noted that in the appended claims where the word "truck" is used, the same is intended to include the load on the truck (i. e. the portion of the weight of the motors etc. carried by the truck frame), other than the superstructure which is designated as "load" in some the claims.

The invention claimed and desired to be secured by Letters Patent, is:

1. A locomotive comprising a truck; a superimposed load; pivotal connecting means between the load and the truck; resilient load carrying elements interposed between said load and truck, in a symmetrical triangular position, said elements being adapted to slide on one of them and radially movable in unison about the pivotal connecting means, whereby the load centroid of said load and said truck is maintained in a central position with relation to the resilient elements; and resilient means for supporting the truck frame on the axles of the truck, pivotally connected to the truck frame at three points.

2. A locomotive comprising a truck; a superimposed load; pivotal means, free vertically, connecting the load and the truck; resilient supporting elements triangularly interposed between said load and said truck, said elements being adapted to slide on one of them and radially movable in unison about the pivotal connecting means, whereby the load centroid of said load and said truck is maintained in a central position with relation to the resilient elements; and resilient means for supporting the truck frame on the axles of the truck, pivotally connected to the truck frame at three points.

3. A locomotive comprising a truck; a superimposed load; pivotal means, connecting the load and truck; resilient supporting means interposed between said load and said truck, radially movable in unison relative to one of them, and symmetrically disposed with respect to the load centroid of the superimposed load and said truck; and resilient means for supporting the truck frame on the axles of the truck, pivotally connected to the truck frame at three points.

4. A locomotive comprising a truck; a superimposed load; pivotal connecting means between the load and truck; resilient supporting means interposed between said load and said truck to form a three-point support symmetrical with the load centroid of said load and said truck, said resilient supporting means being radially movable in unison on one of them, about the pivotal connecting means; and means for supporting the truck frame on the axles of the truck, pivotally connected to the truck at three points.

5. A locomotive comprising a cab; motor trucks; hollow, vertically free, pivotal means connecting the cab and a truck permitting relative radial movement therebetween; horizontally movable supporting means, including springs, interposed between the cab and the truck frame, and disposed to form a three-point support symmetrical with the load centroid of said cab and said truck, one of said points being centrally disposed between the sides of the locomotive; and means for supporting the truck frame on the axles of the truck, including springs, and equalizers pivotally connected to said truck frame at three points symmetrically disposed with respect to the load centroid.

6. A locomotive comprising a cab; a motor truck; hollow pivotal means connecting the cab and truck and free for vertical relative movement of its parts; a plurality of horizontally movable supporting elements including springs interposed between the cab and the truck to permit said vertical relative movement and disposed to form a three point support for said cab symmetrical with the load centroid of said cab and said truck and adapted for rotation about the pivotal connecting means, one of said supporting elements including a hollow shoe; means for supporting the truck frame on axles; and motor supporting hollow transoms formed in the truck frame and adapted to form portions of air ducts to supply cooling air to the motors, other portions of said ducts comprising the hollow pivotal means, the said hollow shoe, and an air duct on said cab.

7. A locomotive comprising a cab; a truck supporting said cab adjacent an end thereof, said truck having a frame, wheels mounted on axles, springs, and motors adapted to drive the wheels; hollow pivotal means connecting the cab and the truck frame, free for vertical relative movement of its parts; a plurality of cab supporting means including springs and shoes interposed between the cab and the truck to permit said vertical movement, and symmetrically disposed with respect to the load centroid of said cab and said truck to insure equable distribution of weight, said supporting means being radially movable with respect to the pivotal connecting means, and one of said supporting means including a hollow shoe; means for supporting the truck frame on said axles including equalizing means for the truck springs, pivotally attached at three points on the truck frame symmetrical with the load centroid; and motor supporting hollow transoms formed in the truck frame, and adapted to form portions of air ducts for supplying cooling air to the motors, the said cab having air ducts communicating with said transoms through said hollow pivotal connecting means and the said hollow shoe.

8. A locomotive comprising a load; a truck; resilient supporting means slidable on said truck, disposed to form a three point support symmetrical with the load centroid of said load and said truck, one of said points being located centrally between the sides of the locomotive; pivotal guiding means connecting said load and said truck permitting relative radial movement therebetween; truck springs; and equalizers connected to the truck springs, and pivotally attached to the truck frame to form a three point suspension symmetrical with the load centroid.

9. A locomotive comprising motors; a cab having a cooling duct and a hollow pivotal guide member; a truck comprising motor supporting hollow transoms formed in the truck frame; a plurality of resilient means for supporting the cab at three points symmetrically disposed with respect to the load centroid of said cab and said truck, interposed between the cab and the truck to permit vertical relative movement and radially movable with respect to said pivotal member, one of said supporting means including a hollow slidable shoe; a hollow pivotal guide member on said truck cooperating with the guide member of the cab for connecting the said cab and truck and allowing a vertically free relative movement between them; and resilient means for supporting the truck on its axles, the said cab duct, said hollow transoms, said hollow slidable shoe, and hollow pivotal connecting means cooperating with each other so as to form cooling air ducts for said motors.

10. A locomotive comprising a load; a motor truck including wheels mounted on axles, truck springs mounted on the axles, equalizers connecting the springs in pairs, a truck frame, and pivotal connections on the frame for the equalizers, disposed symmetrically with respect to the load centroid; supporting means including springs, interposed between the truck frame and the load and adapted to carry the weight of said load on three points symmetrically disposed with respect to the load centroid of said load and said truck, one of said points being disposed centrally between the sides of the locomotive; and pivotal guiding means, free vertically, connecting the load and the truck and permitting relative radial movement therebetween, the said supporting means being radially movable about said pivotal guiding means.

11. A locomotive comprising a truck; a superimposed load; pivotal means connecting the load and truck, permitting relative radial movement therebetween; resilient supporting means interposed between said load and said truck, movable in unison relative to one of them, and normally symmetrically disposed with respect to the load centroid of the superimposed load and said truck; and means for supporting the frame of the truck on the axles thereof, pivotally connected to the truck at three points.

12. A locomotive comprising a load; a motor truck; pivotal connecting means between the load and truck, permitting relative movement therebetween; resilient supporting means interposed between said load and said truck to form a three point support symmetrical with the load centroid of said load and truck, one of said points being disposed between the sides of the locomotive, said supporting means being radially movable about the pivotal connecting means; and means for supporting the truck frame on the axles of the truck, pivotally connected to the truck frame at three points.

13. A locomotive comprising a truck; a superimposed load; means pivotally connecting the load and the truck, permitting relative radial movement therebetween; resilient elements for transmitting the load to the truck frame, triangularly interposed between said load and said truck frame to form a three point support symmetrical with the load centroid of the said truck and said superimposed load, said elements being adapted to slide on one of them and radially movable in unison about the pivotal connecting means; and resilient means for transmitting the load from the frame to the truck axles, pivotally connected to the truck frame at three points.

14. A locomotive comprising a truck; a superimposed load; pivotal connecting means between the load and the truck, permitting relative radial movement therebetween; resilient supporting elements triangularly interposed between said load and truck to form a three point support symmetrical with the load centroid of said load and said truck, each of said elements adapted to slide on one of them and radially movable about the connecting means; and means for supporting the frame of the truck on the axles thereof connected to form one point of spring equalization on one longitudinal side of the truck, one point of spring equalization on the other longitudinal side of the truck, and one point of spring equalization on said truck between said other two points and out of line therewith.

15. A locomotive comprising a truck; a superimposed load; a pivotal connecting means between the load and the truck, permitting relative radial movement therebetween; resilient supporting elements interposed between said load and said truck to form a three point support symmetrical with the load centroid of said load and said truck and movable in unison radially about said pivotal connecting means; and suspension means for supporting the frame of the truck on the axles thereof comprising a single series of equalizing connections at each side of the truck for effecting a uniform distribution on the wheels, and a third series partly on one side and partly on the other side of the truck.

16. A locomotive comprising a truck; a superimposed load; pivotal connecting means between the load and truck, permitting relative radial movement therebetween; resilient supporting elements interposed between said load and truck to form a three point support symmetrical with the load centroid of said load and truck and movable in unison radially about said pivotal connecting means; and means for supporting the truck frame on the axles of the truck comprising a plurality of spring groups, one of said groups having two oppositely disposed sets of springs, said sets being connected for equalization at points on the sides of the truck approximately midway their lengths, and another spring group having spring members on opposite sides of the truck connected to be equalized at a point disposed on said truck between the sides thereof.

CHARLES W. TODD.